United States Patent
Barrios Albert et al.

(10) Patent No.: US 11,807,056 B2
(45) Date of Patent: Nov. 7, 2023

(54) BREAK-AWAY TOW HOOK

(71) Applicant: Rivian IP Holdings, LLC, Plymouth, MI (US)

(72) Inventors: Jorge Guillermo Barrios Albert, Farmington Hills, MI (US); Robert J. Briggs, Plymouth, MI (US); Mohammed Nomaan Khan, Farmington Hills, MI (US); Vilaskumar Waghmare, Novi, MI (US); David Bauch, South Lyon, MI (US); Randy R. Frank, Silverado, CA (US); Gavin Goodchild, Ontario (CA)

(73) Assignee: Rivian IP Holdings, LLC, Plymouth, MI (US)

( * ) Notice: Subject to any disclaimer, the term of this patent is extended or adjusted under 35 U.S.C. 154(b) by 162 days.

(21) Appl. No.: 17/232,310

(22) Filed: Apr. 16, 2021

(65) Prior Publication Data

US 2022/0332157 A1    Oct. 20, 2022

(51) Int. Cl.
*B60D 1/54* (2006.01)
*B60D 1/56* (2006.01)
*B60D 1/24* (2006.01)

(52) U.S. Cl.
CPC .............. *B60D 1/54* (2013.01); *B60D 1/565* (2013.01); *B60D 1/243* (2013.01)

(58) Field of Classification Search
CPC ................................ B60D 1/243; B60D 1/565
See application file for complete search history.

(56) References Cited

U.S. PATENT DOCUMENTS

| | | | | |
|---|---|---|---|---|
| 7,290,783 B2* | 11/2007 | Dornbos | ................. | B60D 1/244 280/495 |
| 7,431,366 B2* | 10/2008 | Sankrithi | ............... | B62D 47/003 296/64 |
| 8,246,069 B2* | 8/2012 | Ladzinski | ................. | B60D 1/56 280/495 |
| 10,131,193 B2* | 11/2018 | Degenkolb | ............. | B60D 1/488 |
| 10,457,104 B2* | 10/2019 | Shenaq | ................... | B60D 1/565 |
| 10,464,382 B2* | 11/2019 | Ghannam | ............... | B60D 1/167 |
| 10,654,530 B2* | 5/2020 | Milton | ................. | F16H 57/0476 |
| 10,787,052 B2* | 9/2020 | Shenaq | ................... | B60D 1/565 |

(Continued)

FOREIGN PATENT DOCUMENTS

CN    202368279 U    *    8/2012
CN    204915157 U    *    12/2015

*Primary Examiner* — Kevin Hurley
(74) *Attorney, Agent, or Firm* — Clements Bernard Walker; Christopher L. Bernard

(57) ABSTRACT

Disclosed embodiments include apparatuses, vehicles, and methods for a break-away tow hook. In an illustrative embodiment, an apparatus includes a tow hook configured to extend in a first direction from a surface of a vehicle and to receive a towing line. A mount is configured to displaceably secure the tow hook to the surface. The mount is configured to maintain a position of the tow hook relative to the surface in response to a pulling force being applied to the tow hook in a first direction away from the surface of the vehicle. The mount is further configured to enable the tow hook to move relative to the surface in response to the tow hook incurring a force in a second direction, wherein the second direction is at least partially toward the surface of the vehicle.

18 Claims, 10 Drawing Sheets

(56) References Cited

U.S. PATENT DOCUMENTS

| | | | | |
|---|---|---|---|---|
| 10,801,392 B2* | 10/2020 | Dudar | .................... | F01P 7/048 |
| 11,214,107 B2* | 1/2022 | Greggs | ................. | B60D 1/565 |
| 11,376,903 B2* | 7/2022 | Frisch | .................... | B60D 1/56 |
| 2022/0288984 A1* | 9/2022 | Chauhan | ................. | B60D 1/56 |

\* cited by examiner

BREAK-AWAY TOW HOOK

INTRODUCTION

The present disclosure relates to a tow hook for a vehicle.

The statements in this section merely provide background information related to the present disclosure and may not constitute prior art.

Trucks, sport-utility vehicles, and other motorized vehicles may include tow hooks. Tow hooks are typically mounted to a front bumper or other front-facing surface or to a rear bumper or other rear-facing surface of the vehicle. Each of the tow hooks is configured to receive a tow line or other cable. Thus, for example, with a first end of one or more tow lines secured to the tow hooks and a second end attached to a towing vehicle, the tow hooks may enable the vehicle to be towed. For another example, with the first end of one or more tow lines secured to the tow hooks and a second end attached to an object or another vehicle, the vehicle can move to pull on or move the object or to tow another vehicle. Thus, including tow hooks on a vehicle thus may prove convenient for various uses.

Many vehicles are designed to be crashworthy so as to distribute, for example, a force on a front bumper or other frontal surface incurred in a collision. Distribution of the force may minimize injury to occupants or damage to the vehicle that may occur as a result of an impact on the front bumper or other surface. Systems designed to improve crashworthiness of a vehicle may be designed to distribute the force across a bumper or other forward area of a vehicle. Such a design can seek to avoid localized forces which could result in an acute deformation or possible collapse of portions of the vehicle. Similarly, sensors used to initiate deployment of airbags or other safety devices may be positioned and calibrated at or near a front surface of a vehicle to trigger deployment upon detecting an impact of a particular magnitude. However, with tow hooks extending from the front bumper or other frontal surface, the impact on the tow hooks may interfere with the distribution or measurement of force across the bumper or other frontal surface.

BRIEF SUMMARY

Disclosed embodiments include apparatuses, vehicles, and methods for a break-away tow hook.

In an illustrative embodiment, an apparatus includes a tow hook configured to extend in a first direction from a surface of a vehicle and to receive a towing line. A mount is configured to displaceably secure the tow hook to the surface. The mount is configured to maintain a position of the tow hook relative to the surface in response to a pulling force being applied to the tow hook in a first direction away from the surface of the vehicle. The mount is further configured to enable the tow hook to move relative to the surface in response to the tow hook incurring a force in a second direction, wherein the second direction is at least partially toward the surface of the vehicle.

In another illustrative embodiment, a vehicle includes a vehicle body. A cabin is incorporated in the vehicle body and configured to receive an operator. A drive system is supported by the vehicle body and configured to control one or more wheels of the vehicle to motivate, accelerate, decelerate, stop, and steer the vehicle. A tow hook is configured to extend in a first direction from a surface of the vehicle body and to receive a towing line. A mount is configured to displaceably secure the tow hook to the surface. The mount is configured to maintain a position of the tow hook relative to the surface in response to a pulling force being applied to the tow hook in a first direction away from the surface of the vehicle. The mount is further configured to enable the tow hook to move relative to the surface in response to the tow hook incurring a force in a second direction, wherein the second direction is at least partially toward the surface of the vehicle.

In a further illustrative embodiment, a method includes providing a tow hook at a surface of a vehicle. The tow hook is mounted to the surface in an initial position. The tow hook is mounted such that, in response to a pulling force being applied to the tow hook in a first direction away from the surface of the vehicle, the tow hook is maintained in the initial position relative to the surface. In response to the tow hook incurring a force in a second direction at least partially toward the surface of the vehicle, the tow hook is allowed to be displaced away from the surface.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

The following description explains, by way of illustration only and not of limitation, various embodiments of apparatuses, vehicles, and methods for using a break-away tow hook on a surface of a vehicle.

Figure 1:
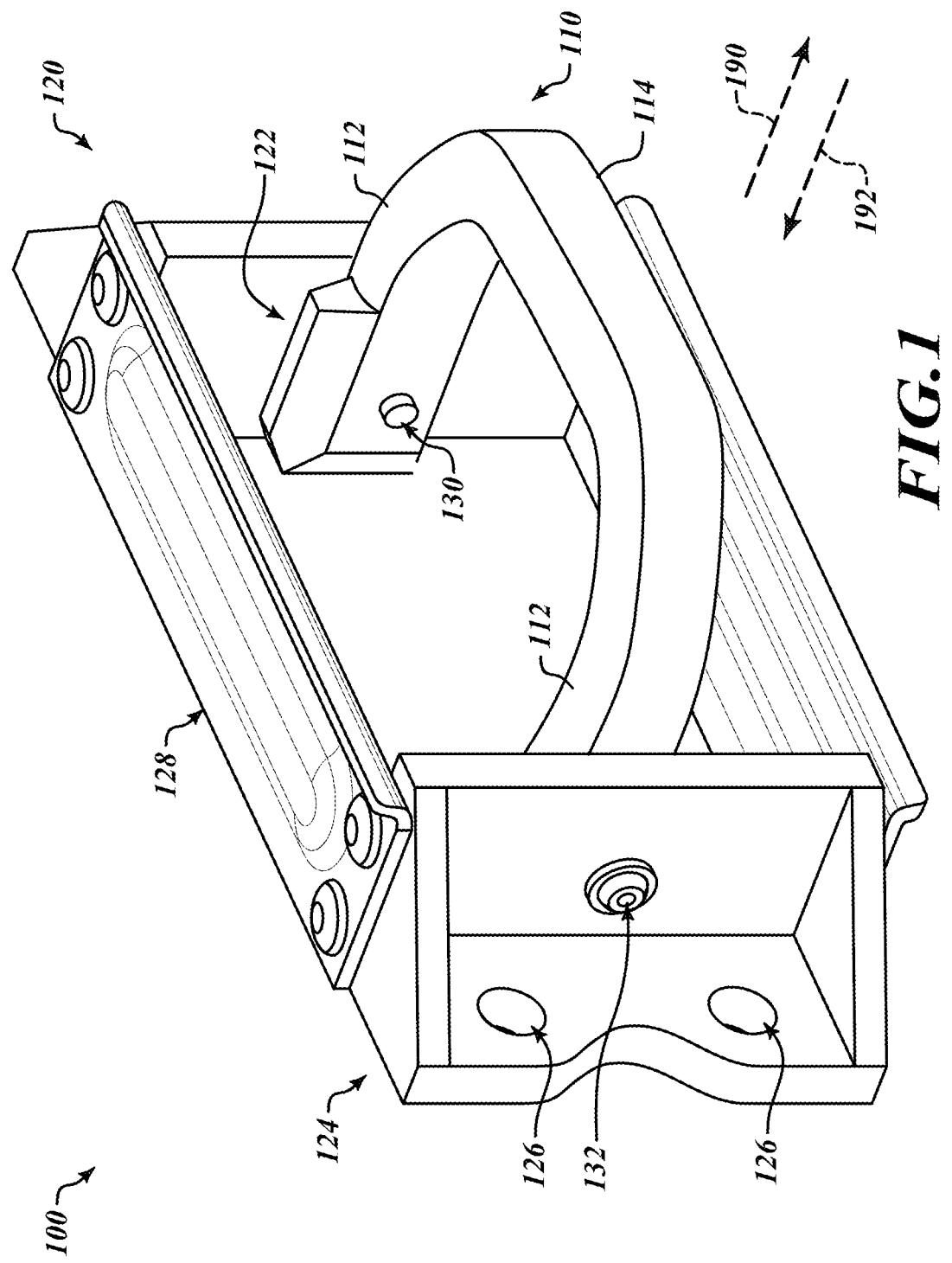
FIG. 1 is a perspective view of an illustrative break-away tow hook.

Referring to FIG. 1, in various embodiments a break-away tow hook assembly 100 includes a tow hook 110, a mount 120, and a connector 130 that joins the tow hook 110 to the mount 120. The tow hook 110 includes base portions 112 that generally extend in a first direction 190 toward a forward end of a vehicle (not shown). A transverse portion 114 extends between the base portions 112, thereby forming the tow hook 110 to which a tow cable or other line may be attached, as further described below with reference to FIG. 5.

The mount 120 includes side portions 122 to which the base portions 112 are coupled. As further described below, the mount 120 may be a separate apparatus that is mountable on a bumper or other front surface of a vehicle (not shown in FIG. 1) or may be integrated into a bumper or other frontal surface of the vehicle, as further described below. When the mount 120 is a separate apparatus (i.e., not integrated into a front surface of a vehicle, as described further below), the mount 120 may include one or more mounting surfaces 124 that define one or more mounting holes 126 to receive mounting connectors (not shown in FIG. 1) to secure the mount 120 to a bumper or other frontal surface of a vehicle. The mount 120 also may include cross members 128 extending between the side portions 122 to buttress the mechanical solidity of the mount 120. The side portions 122 and the cross members 128 may be configured to prevent or limit rotation of the tow hook 110 when an impact occurs. Correspondingly, the mounting surfaces 124 may be configured to prevent or limit rotation of the break-away tow hook assembly 100 when an impact occurs. It will be appreciated that aspects of the vehicle may be configured to absorb and/or distribute the energy of an impact, thus, it may be undesirable for forces acting on the tow hook 110 or the break-away tow hook assembly 100 permit their rotation in such a way that may interfere with the vehicle's intended distribution of force across a surface where the break-away tow hook assembly 100 may be mounted. In various embodiments, the side portions 122 and cross members 128 may be formed as a single apparatus or may include separate components that are mechanically joined together.

The connector 130 may include a pin, bolt, screw, or similar connecting apparatus that extends through at least one of the base portions 112 into at least one of the side portions 122. The connector 130 thereby secures the tow hook 110 to the mount 120. The connector 130 may include a body (not shown in FIG. 1) and a head 132 to facilitate installation and/or connection of the connector 120 with the mount 120 and the tow hook 110.

It will be appreciated that the base portions 112, the side portions 122, and the connectors 130 all operate as part of a mounting of the tow hook 110. Thus, each of the base portions 112, the side portions 122, and the connectors 130 may be incorporated into the displaceable mounting of the tow hook 110 as herein described.

As further described below, the break-away tow hook assembly 100 is configured to withstand pulling forces generally applied in the first direction 190 away from a surface of the vehicle (not shown in FIG. 1), such as pulling forces applied to the tow hook 110 as a result of the vehicle being towed or applied as a result of the vehicle attempting to pull another object or vehicle. Conversely, in response to an impact force or other compressive force having an appreciable component in a second direction 192 that is at least partially toward the surface of the vehicle, portions of the break-away tow hook assembly 100 are configured to be breakable or otherwise deformable to facilitate displacement of the tow hook 110. Specifically, one or more of the base portions 112, the side portions 122, and the connector 130 may be shearable, breakable, or otherwise deformable to facilitate displacement of the tow hook 110 relative to the mount 120 in response to application of a force in the second direction 192 applied against the tow hook 110. With the displacement of the tow hook 110, forces in the second direction 192 may be received and displaced by structures of the vehicle. As previously stated, although the forces in the second direction 192 are depicted in FIG. 1 as being applied diametrically or perpendicularly toward the tow hook 110 and, thus, toward the vehicle, it will be appreciated that forces applied in the second direction 192 may include any force that is at least partially directed toward the tow hook 110 and/or the surface of the vehicle.

Figure 2:
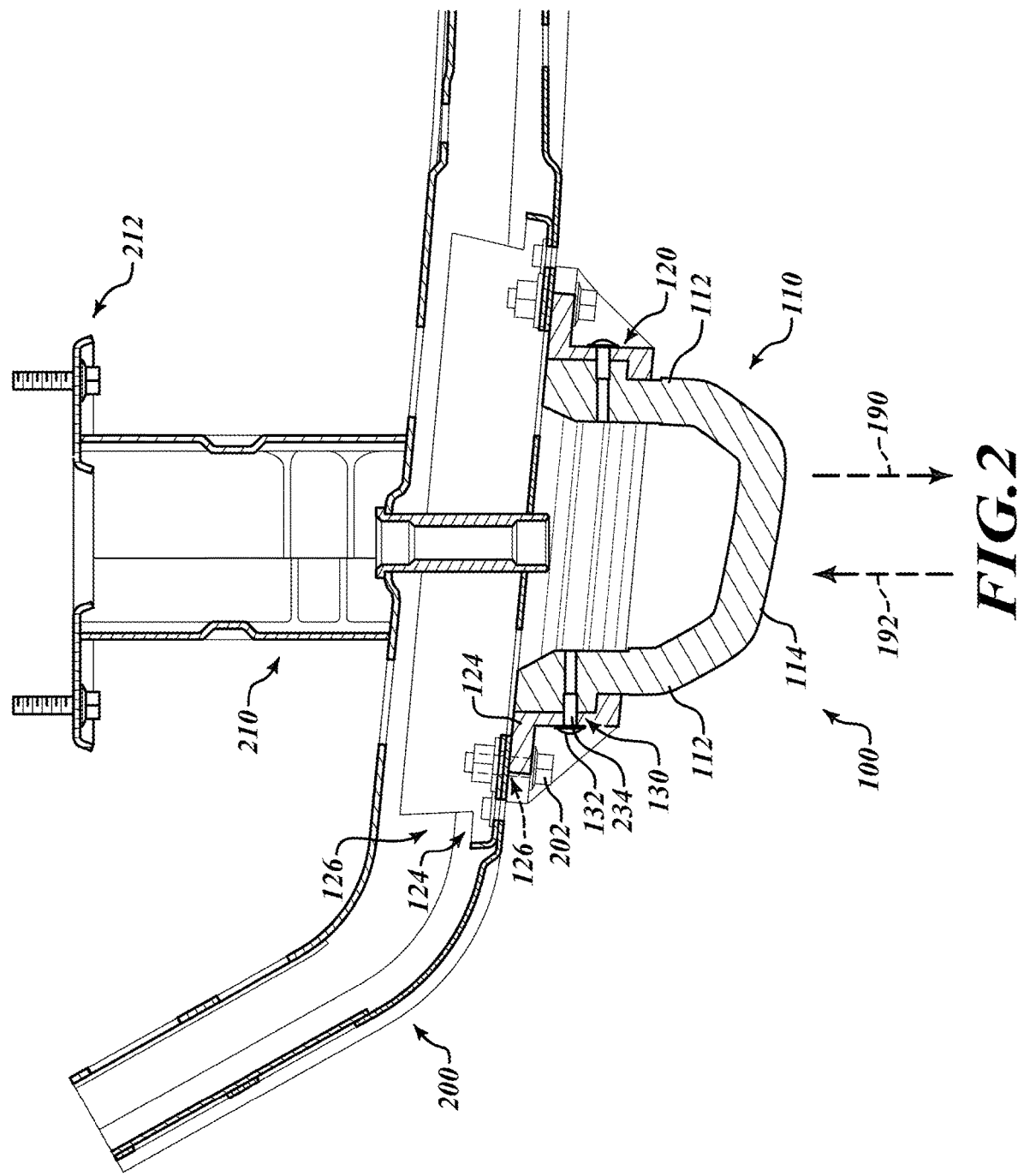
FIG. 2 is a cross-sectional view of the break-away tow hook of FIG. 1 mounted to a front bumper.

Referring additionally to FIG. 2, in various embodiments the break-away tow hook assembly 100 is mechanically secured to a bumper 200 or another surface of the vehicle (not shown in FIG. 2). In some embodiments the break-away tow hook assembly 100 is mechanically secured with bolts 202 that extend through the mounting holes 126 in the mounting surfaces 124 of the mount 120. The bumper 200 in turn is coupled to a bumper mount 210 that joins the bumper 200 to a frame 212 of the vehicle. The bumper mount 210 may include a compressible or deformable apparatus configured to disperse force and energy resulting from an impact against the bumper 200 to reduce the force and energy applied to the frame 212. Reducing the force and energy applied to the frame 212 thus may help contribute to reducing or possibly avoiding injury to occupants of the vehicle, damage to the vehicle, and/or other effects. For example, the bumper mount 210 may be configured to disperse forces to help contribute to reducing or possibly avoiding collapse of a passenger compartment to seek to prevent injuries to occupants. For another example, the bumper mount may be configured to transfer force to help contribute to reducing or possibly avoiding collapse of an engine compartment or battery compartment to help contribute to reducing or possibly avoiding damage to costly components of the vehicle. In any case, the bumper mount 210 may be configured to work in conjunction with the bumper 200 to facilitate dispersal of such force and energy to reduce the force and energy applied to the frame 212.

In permitting the tow hook 110 to be displaced, the break-away tow hook assembly 100 thereby allows convenient placement of the tow hook assembly 100 to fulfill its various uses while allowing the tow hook 110 to be displaced in response to a collision or other event. As a result, the tow hook 100 may not interfere with the distribution of forces and energy that may result from an impact. Thus, the break-away tow hook assembly 100 may be installed at a conveniently-accessible location on the vehicle, rather than being mounted, for example, beneath and/or behind a bumper or fascia to remove the tow hook from receiving an initial impact in a way that might defeat crumple zones or other structures of the vehicle intended to absorb and/or distribute the energy of an impact.

Figure 3:
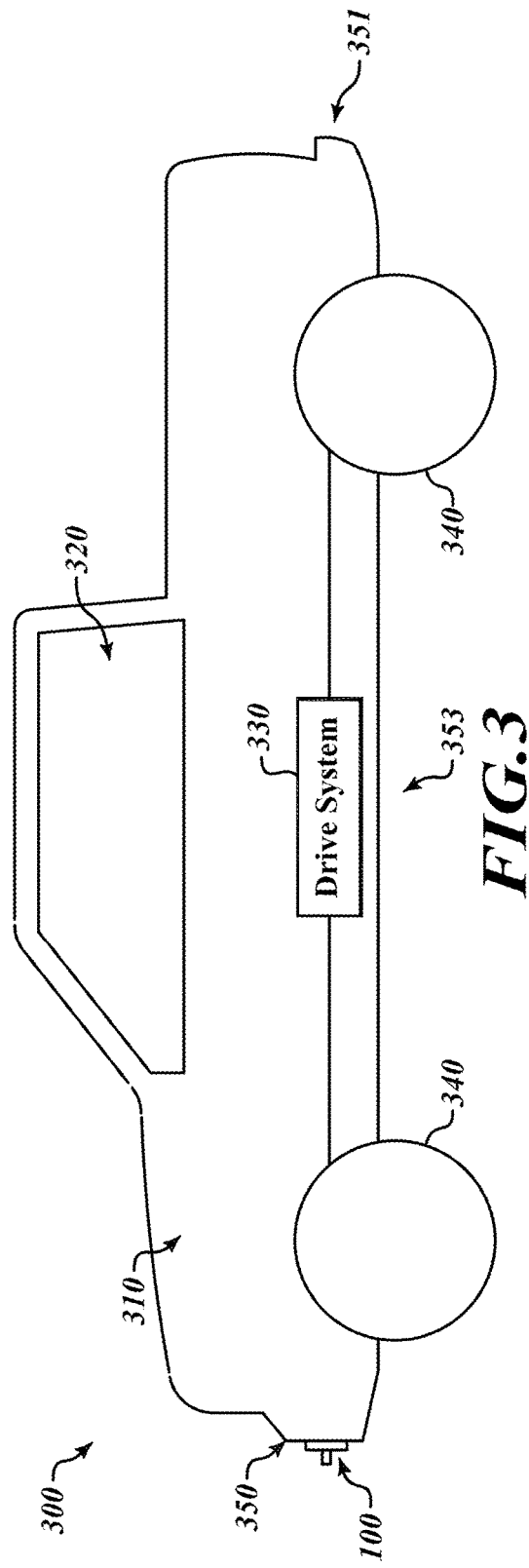
FIG. 3 is a diagram in partial schematic form of an illustrative vehicle that includes the break-away tow hook of FIG. 1 mounted to a front bumper.

Referring additionally to FIG. 3, in various embodiments a vehicle 300 includes a vehicle body 310 that includes a cabin 320 or other compartment to receive an occupant or cargo. The vehicle 300 also includes a drive system 330 that operates in conjunction with one or more wheels 340 of the vehicle 300 to motivate, accelerate, decelerate, stop, and steer the vehicle 300. In various embodiments, the drive system 330 may include an electric power system, or a hybrid power system, or an internal combustion engine, as well as braking and control systems. The vehicle 300 includes a frontal surface 350, which may include a bumper or other frontal surface, that operates in conjunction with systems as described with reference to FIG. 2 to disperse forces and energies that may be applied to the frontal surface 350 in a collision or other event. The break-away tow hook assembly 100 is coupled to the frontal surface 350 as described with reference to FIG. 2, such as by using the bolts 202 (not shown in FIG. 3) to join the break-away tow hook assembly 100 to the frontal surface 350. Although FIG. 3 shows the break-away tow hook assembly 100 mounted at the frontal surface 350 of the vehicle 300, the break-away tow hook assembly 100 also may be coupled to a rear surface 351 of the vehicle 300 or at one or more positions along one or more side surfaces 353 of the vehicle 300. It will be appreciated that the break-away tow hook assembly 100 may be coupled to a bumper, one or more frame rails, a sub-frame chassis, or any other structure incorporated in the body of the vehicle 300.

Figure 4:
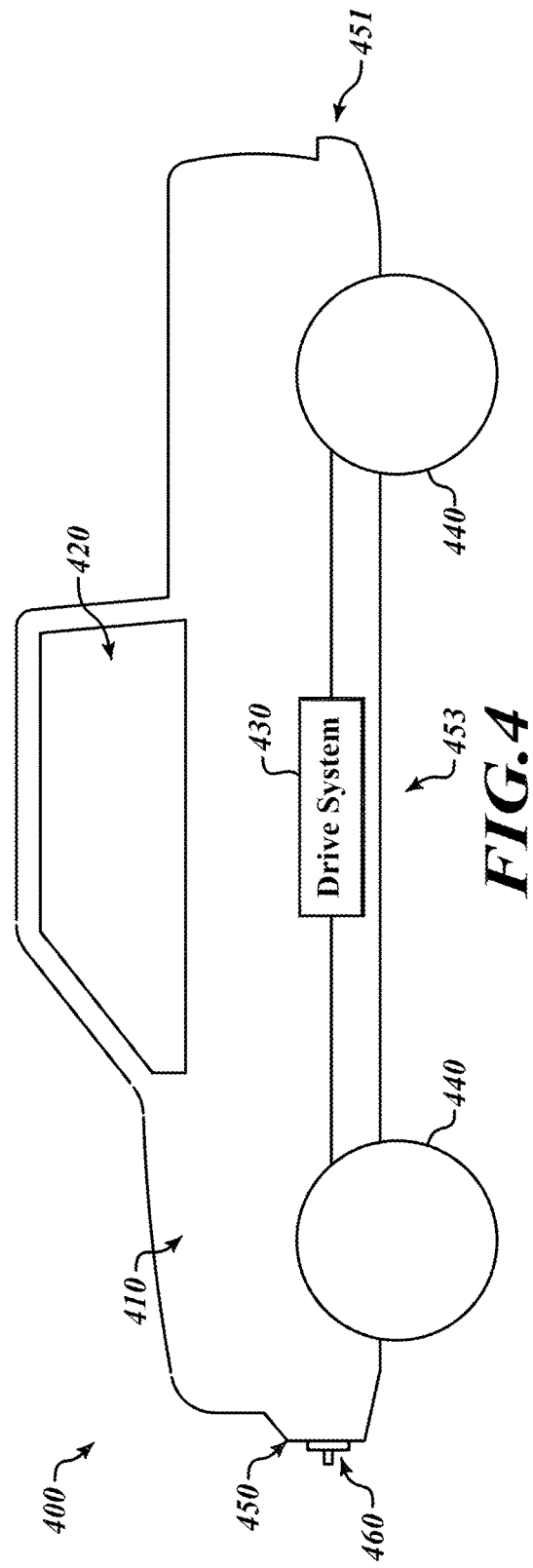
FIG. 4 is a diagram in partial schematic form of an illustrative vehicle that includes the break-away tow hook of FIG. 1 integrated into a front bumper.

Referring additionally to FIG. 4, in various embodiments a vehicle 400 also includes a vehicle body 410 that includes a cabin 420 or other compartment to receive an occupant or cargo. The vehicle 400 also includes a drive system 430 that operates in conjunction with one or more wheels 440 of the vehicle 400 to motivate, accelerate, decelerate, stop, and steer the vehicle 400. The vehicle 400 includes a frontal surface 450, which may include a bumper or other frontal surface, that operates in conjunction with systems as described with reference to FIG. 2 to disperse forces and energies that may be applied to the frontal surface 450 in a collision or other event. In contrast to the vehicle 300 (FIG. 3), however, the vehicle 400 includes an integrated break-away tow hook assembly 460 that is integrated and included in the frontal surface 450 (rather than being a separate apparatus that is secured to the frontal surface 450). For example, the side portions 122 and other aspects of the bracket 120 (FIGS. 1 and 2) of the break-away tow hook 460 may be integrally formed as part of the frontal surface 450 of the vehicle 400 (rather than being a separately attached component). Although FIG. 4 shows the integrated break-away tow hook assembly 460 incorporated into the frontal surface 450 of the vehicle 400, the integrated break-away tow hook assembly 460 also may be incorporated in a rear surface 451 of the vehicle 400 or in one or more positions along one or more side surfaces 453 of the vehicle 400. It will be appreciated that the integrated break-away tow hook assembly 460 may be incorporated in a bumper, one or more frame rails, a sub-frame chassis, or any other structure incorporated in the body of the vehicle 400.

Figure 5:
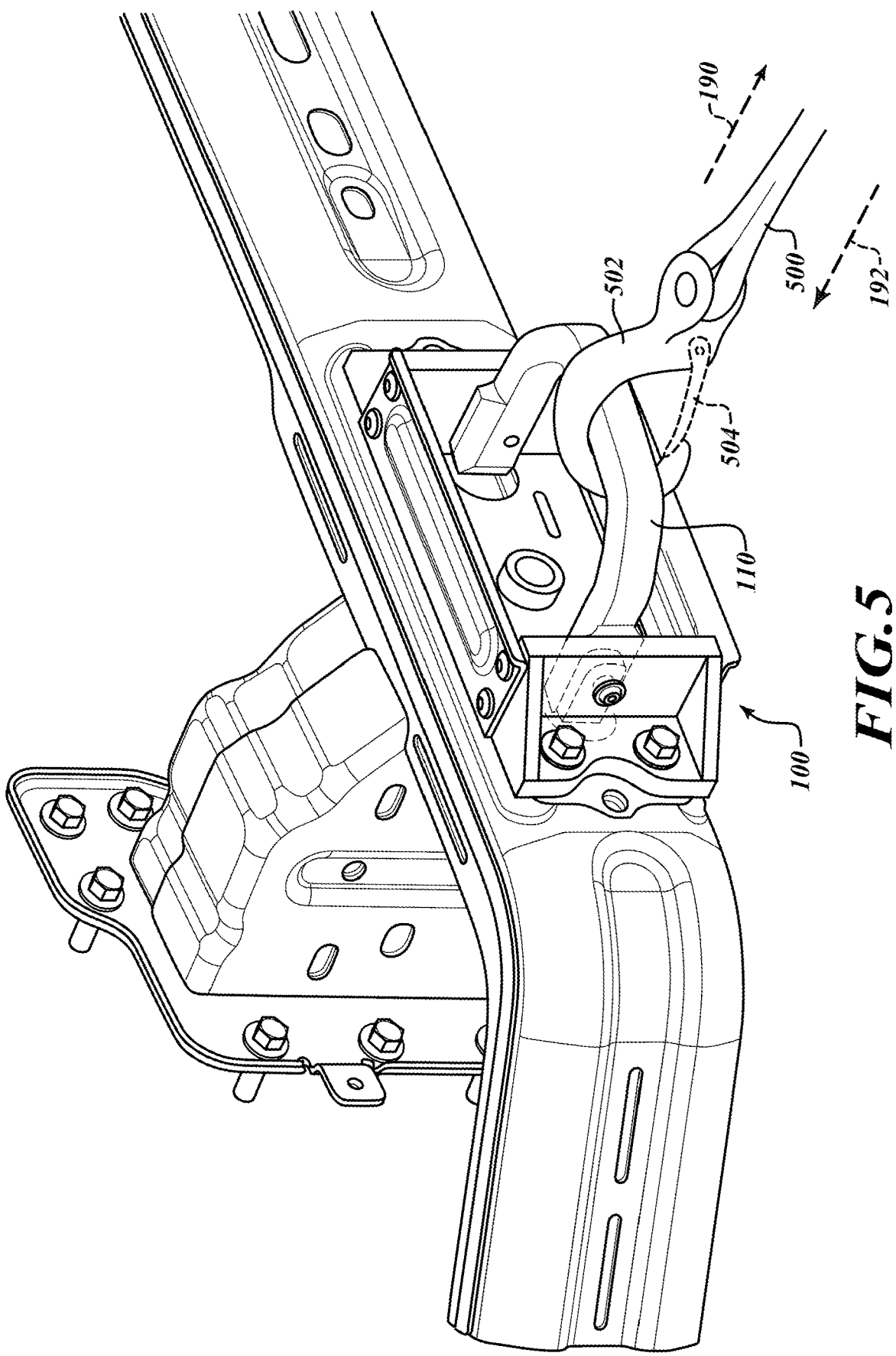
FIG. 5 is a perspective view of the break-away tow hook of FIG. 1 mounted to a front bumper and receiving a tow cable.

Referring additionally to FIG. 5, in various embodiments the break-away tow hook assembly 100 receives a tow line 500 or other cable. The tow line 500, as previously described, may be used to tow the vehicle (not shown in FIG. 5) by the application of force to the tow line 500 in the first direction 190. Alternatively, the tow line 500 may be used to apply force to another vehicle or object (not shown in FIG. 5) by connecting one end of the tow line 500 to the break-away tow hook assembly 100 and another end to the other object and moving the vehicle in an opposite direction to apply a pulling force in the second direction 192. The tow line 500 optionally may include a hook 502 to wrap around the tow hook 110 and/or a latch 504 (shown as a dashed line in FIG. 5) to secure the tow line 500 to the tow hook assembly 100 so that the hook 502 does not slip off the tow hook 110 before tension is applied to the tow line 500. It will be appreciated that the break-away tow hook assembly 100 is configured to withstand pulling forces applied directly along the first direction 190 as well as moments applied by forces with a component transverse to the first direction 190. The break-away tow hook assembly 100 is configured to withstand such forces at least up to the gross towing weight of the vehicle.

Figure 6:
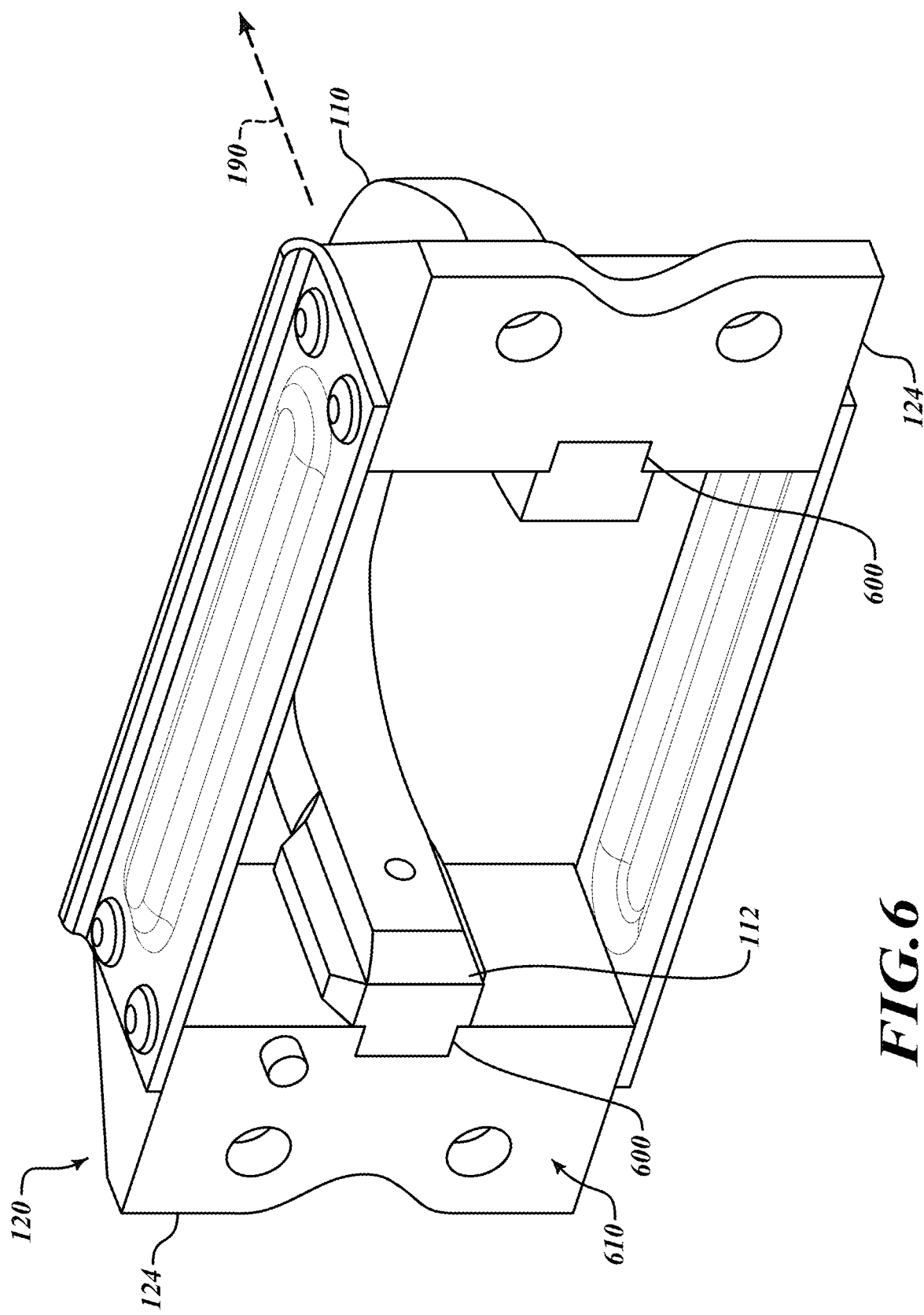
FIG. 6 is a rear perspective view of the break-away tow hook of FIG. 1.

Referring additionally to FIG. 6, in various embodiments the tow hook 110 may include a bracket 600 or brace to engage a surface, such as a rear surface 610 of the mounting surface 124 or another portion of the mount 120 or surface of the vehicle. In such embodiments, use of the bracket 600 or brace can help further support the tow hook 110 in resisting a pulling force in the first direction 190 as described with reference to FIG. 5. In various embodiments, the bracket 600 may include an angled member that extends from the base portions 112 to engage the rear surface 610. When a force (such as a towing or other pulling force) is applied in the first direction 190, the bracket 600 helps to hold the tow hook 110 in place with respect to the mount 120. It will be appreciated that, when the break-away tow hook assembly 100 is integrated into the frontal surface 450 of the vehicle 400 as shown in FIG. 4, the bracket 600 may engage the frontal surface 450 to provide structural support. As further described below, because the break-away took hook assembly 100 is configured to permit displacement of the tow hook 110 in response to application of a non-pulling force, the bracket 600 provides structural support in response to application of a pulling force when it is desired for the break-away took hook assembly 100 to resist displacement of the tow hook 110.

Figure 7:
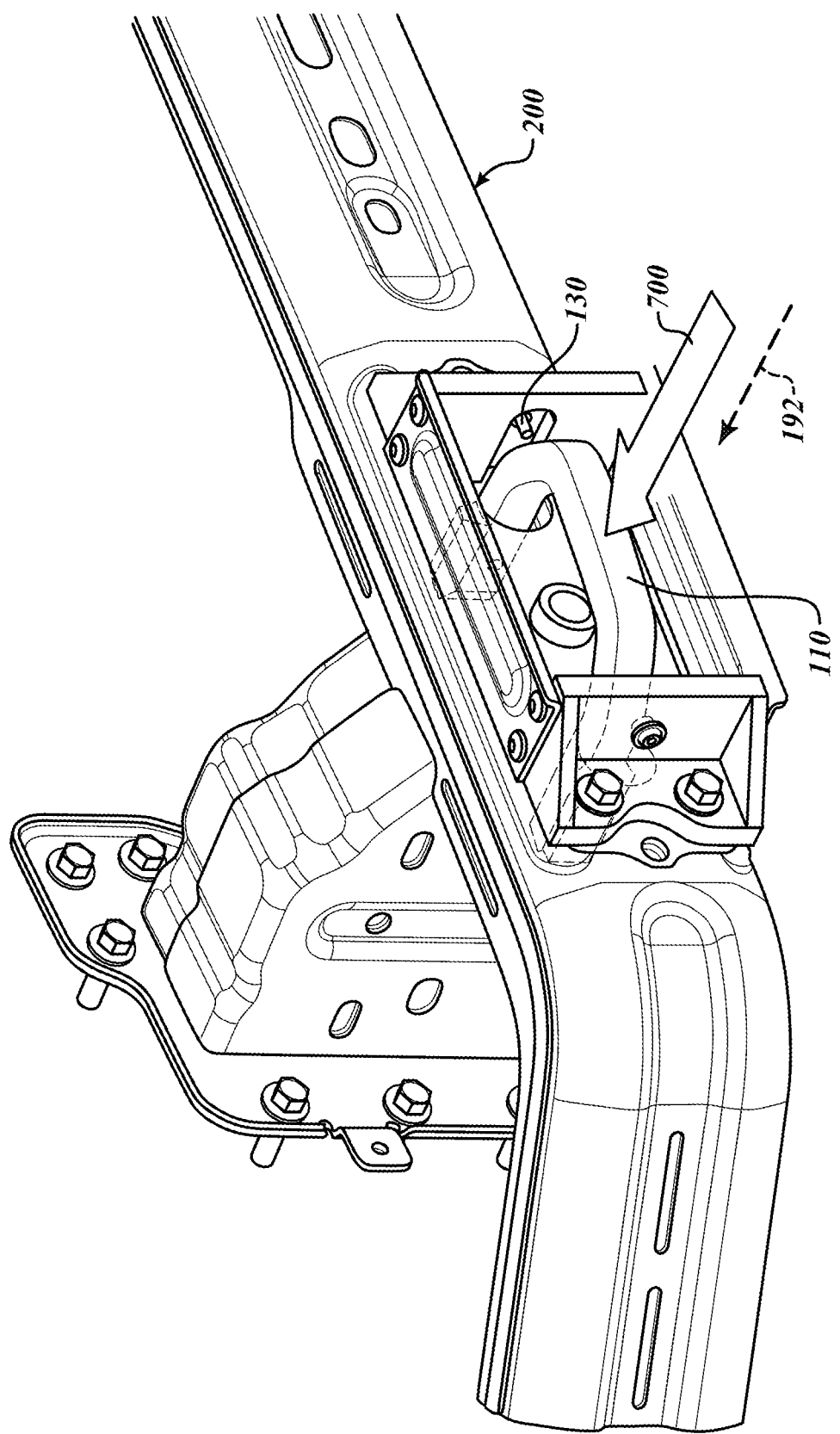
FIG. 7 is a perspective view of the break-away tow hook of FIG. 1 being displaced by application of a force.
Figure 8:
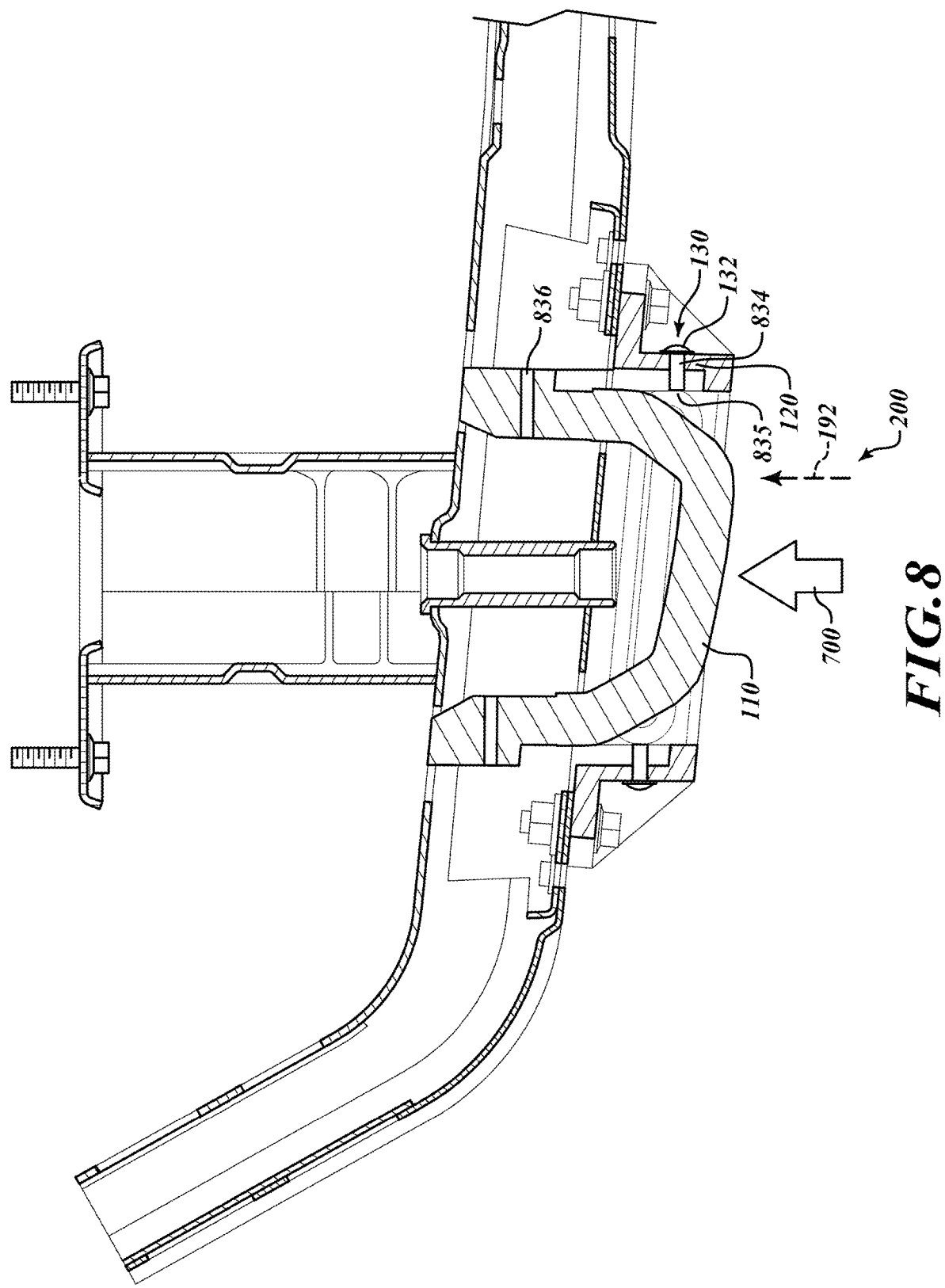
FIG. 8 is a cross-sectional view of the break-away tow hook of FIG. 1 being displaced by application of a force.

Referring additionally to FIGS. 7 and 8 and in various embodiments, when a non-pulling force (such as a frontal impact or other force 700 that is at least partially directed toward a surface of the vehicle, in contrast to a towing force that is directed than away from the surface of the vehicle) is applied to the tow hook 110 in the second direction 192, the break-away took hook assembly 100 is configured to permit displacement of the tow hook 110. The tow hook 110 may be partially or fully displaced from its original position in response to the application of the force in the second direction 192. As previously described, the non-pulling force in the second direction 192 includes any force directed at least partially toward the surface of the vehicle and/or having a component that is directed at least partially toward the surface of the vehicle. Also as previously described, displacement of the tow hook 110 relative to the mount 120 allows for the force to be received and dispersed across the bumper 200 or other frontal surface without the force being localized to the tow hook 110 and the structure to which it is immediately coupled. By allowing the tow hook 110 to be displaced, the force may be received by the bumper 200 and/or the mount 120 which is secured to the bumper 200 to allow for distribution of the force 700 across a wider area and to direct the energy to the bumper mount 210 (FIG. 2) and other devices attached to the bumper 200. As shown in FIGS. 7 and 8, in various embodiments the tow hook 110 is displaceable within the mount 120 to allow a body (not shown in FIG. 7) that presents the force 700 to contact the mount 120 and the bumper 200.

The break-away took hook assembly 100 may be configured to permit displacement of the tow hook 110 in several ways. For example, as shown in FIGS. 7 and 8 and as further described below, the tow hook 110 may be secured to the mount 120 using the shearable or otherwise breakable connectors 130. As a result, when the force 700 exceeds a threshold degree of force, the connectors 130 shear or break, which allows the tow hook 110 to be displaced within the mount 120, the bumper 200, and/or another surface of the vehicle. The threshold may be determined to enable the tow hook 110 to be displaced by impacts with other bodies ranging from pedestrians to other vehicles and even more massive or immovable structures. As previously stated, the tow hook 110 may be partially or completely displaced from its original position where it was initially secured in the mount 120 as described, for example, with reference to FIG. 7.

As shown in FIG. 8, the connectors 130 may include a first section 834 adjoining the head 132 of the connector 130 and that extends through the mount 120 and a second section 836 that extends into the tow hook 110. In response to the force 700 exceeding a predetermined threshold, the first section 834 and the second section 836 are configured to shear at a breaking point 835, thereby enabling the tow hook assembly 100 to be displaced from the mount 120. The breaking point 835 may be a localized manifestation of the shear strength of the connector 130 and, thus, does not necessarily represent a separate structure within the connector 130. Alternatively, the breaking point 835 may represent a narrowed section of the connector 130 between the first section 834 and the second section 836 or may include a preformed cut or occlusion to result in the breaking point 835 of the connector 130 being receptive to shearing or breaking at the breaking point 835. The breaking point 835 may be configured to support a sustained force, such as resulting from a pulling force, but configured to shear in response to an impact force.

It will be appreciated that the displacement of the tow hook also may be supported by configuring the tow hook 110 and/or the mount 120 to be deformable to permit the displacement instead of or in addition to the connector 130 being shearable or breakable.

Figure 9A:
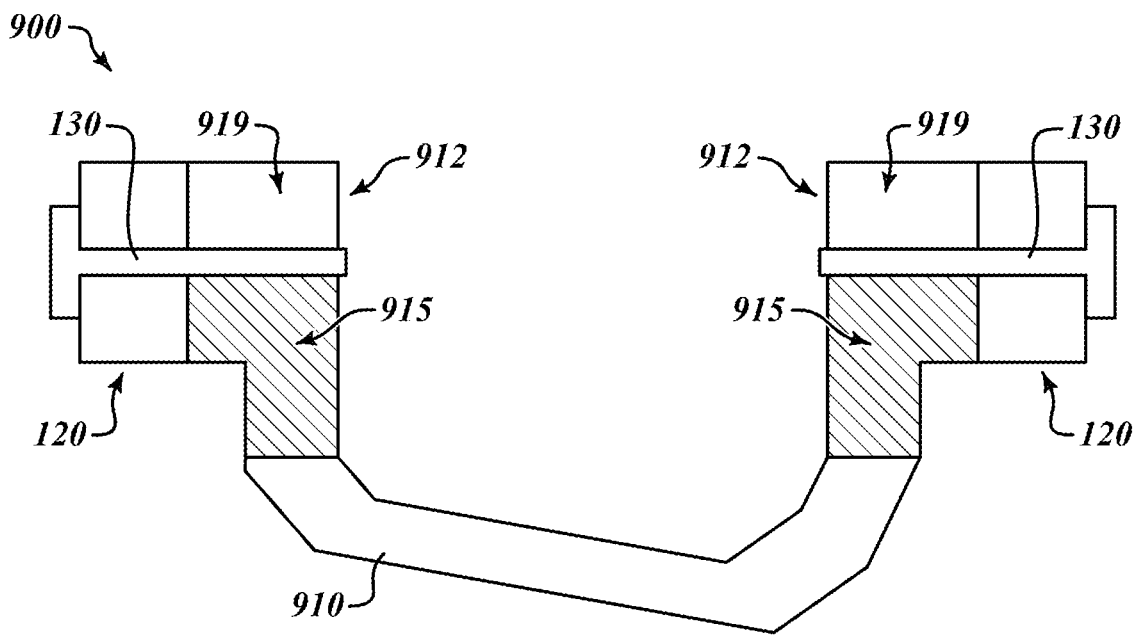
FIGS. 9A and 10A are cross-sectional views of other illustrative break-away tow hooks.
Figure 9B:
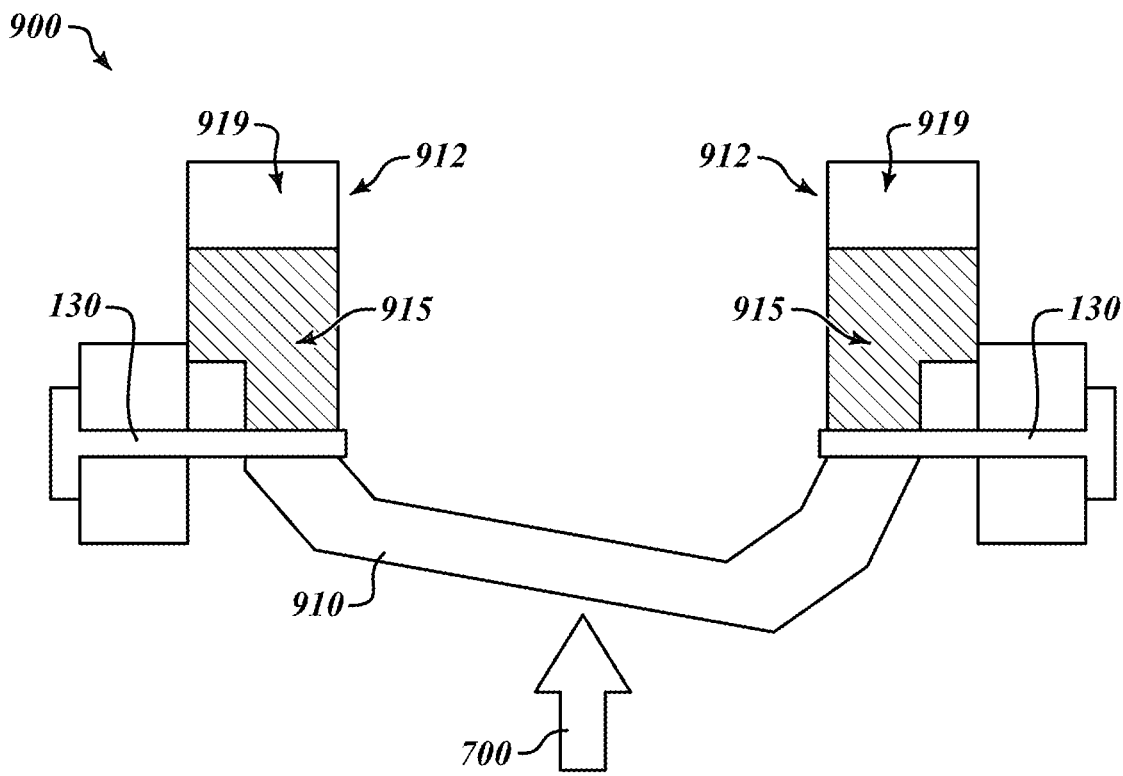
FIGS. 9B and 10B are cross-sectional views of the break-away tow hooks of FIGS. 9A and 10A, respectively, displaced in response to application of a force.

Referring additionally to FIGS. 9A and 9B, in various embodiments deformable base portions 912 of a tow hook 910 may include deformable base regions 915 (represented by cross-hatched areas). The deformable base regions 915 may include a segment of the deformable base portions 912 adjacent to and forward of where the connectors 130 extend through the deformable base portions 912. Including the deformable base regions 915 forward of the connectors 130 may help avoid undermining the resistance of the tow hook 910 to application of a pulling force (not shown in FIGS. 9A and 9B). Rear sections 919 of the deformable base portions 912 are desirably composed of the material and structure of the rest of the tow hook 910 to maintain structural integrity in response to the connectors 130 exerting force against the rear sections 919 in response to application of the pulling force (not shown in FIGS. 9A and 9B). The deformable base regions 915 may be formed of a thinner section of material, may define formed openings to lessen the strength of the deformable base regions 915, may be formed of a porous section of material, may include a slot supporting teeth or partitions that enable the connectors 130 to pass therethrough or may be comprised of a different material to enable the connectors 130 to pass therethrough. The deformable base regions 915 may otherwise be formed to cause the deformable base regions 915 to be more deformable than the rest of the base portions 912, such as by the deformable base regions 915 including press-fit sections that are displaceable relative to other sections of the deformable base regions 915 to permit relative displacement of the connectors 130 in response to the tow hook 910 being acted upon by a force greater than the predetermined threshold. It will be appreciated that the relative placement of the deformable base regions 915 and the rear sections 919 are configured so as to maintain the tow hook 910 in place in response to a towing or other pulling force, but to allow the tow hook 910 to be displaced when an impact is received on the tow hook 910 that exceeds a predetermined threshold.

As shown in FIG. 9B, as a result of application of the force 700 and the force applied to the deformable base regions 915 by the connectors 130, the deformable base regions 915 deform or permit displacement of portions thereof to permit the connectors 130 to move therethrough. By permitting displacement of the connectors 130 attached to the mount 120, the tow hook 910 is displaceable toward and/or into the mount 120 in response to application of the force 700.

Figure 10A:
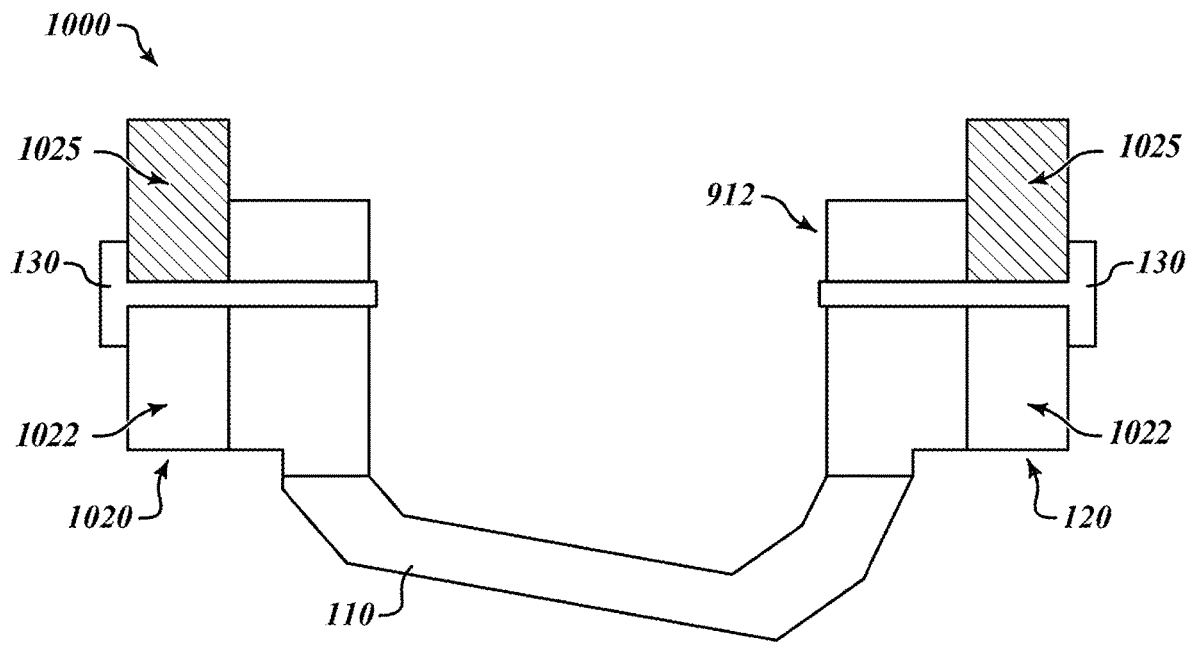
Figure 10B:
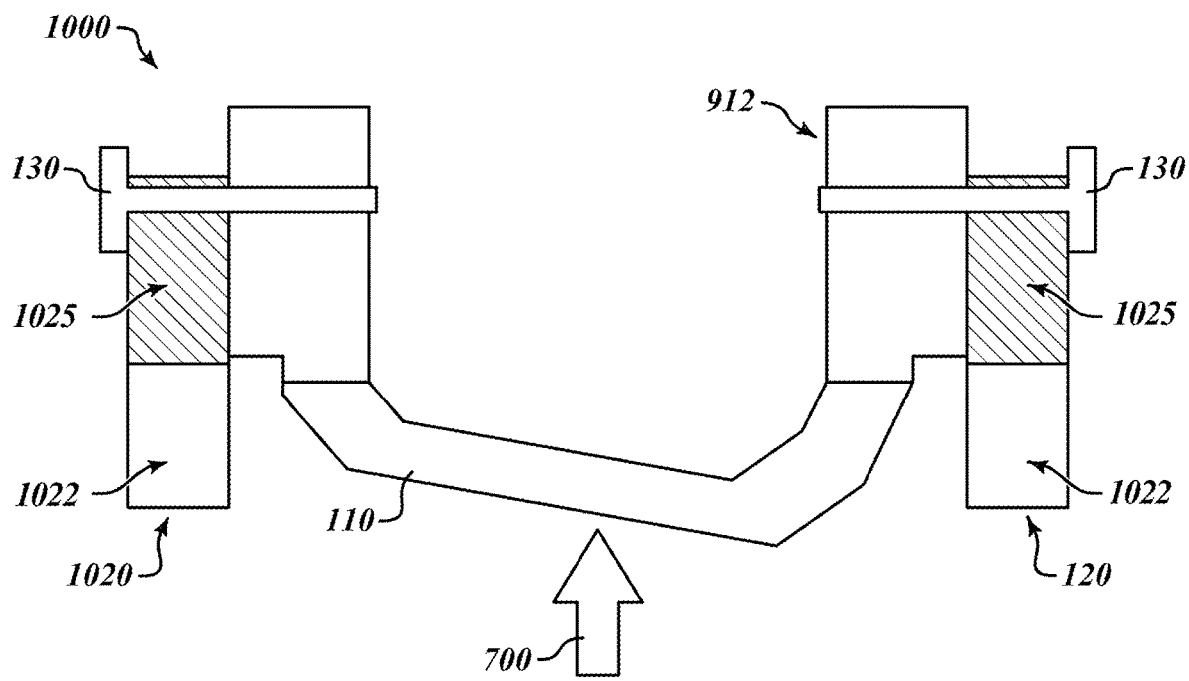

Referring additionally to FIGS. 10A and 10B, in various embodiments deformable side portions 1022 of a mount 1010 of a break-away tow hook assembly 1000 may include deformable side regions 925 (represented by cross-hatched areas). The deformable base regions 1025, analogous to the deformable base regions 915 of the break-away tow hook 900 (FIGS. 9A and 9B), may include a segment of the deformable side portions 1022 adjacent to but rearward of where the connectors 130 extend through the deformable side portions 1022. Including the deformable side regions 1025 rearward of the connectors 130 may help avoid undermining the resistance of the tow hook 110 to application of a pulling force (not shown in FIGS. 10A and 10B). Forward sections 1029 of the deformable side portions 1022 are desirably composed of the material and structure of the rest of the mount 1020 to maintain structural integrity in response to the connectors 130 exerting force against the forward sections 1019 in response to application of the pulling force (not shown in FIGS. 10A and 10B). The deformable side regions 1025 may be formed of a thinner section of material, may define formed openings to lessen the strength of the deformable side regions 1025, may be formed of a porous section of material, may include a slot supporting teeth or partitions that enable the connectors 130 to pass therethrough or the deformable side regions 1025 may be comprised of a different material to enable the connectors 130 to pass therethrough. The deformable side regions 1025 may otherwise be formed to cause the deformable side regions 1025 to be more deformable than the rest of the side portions 1022, such as by the deformable side regions 1025 including press-fit sections that are displaceable relative to other sections of the deformable side regions 1025 to permit relative displacement of the connectors 130 in response to the tow hook 910 being acted upon by a force greater than the predetermined threshold. It will be appreciated that the relative placement of the deformable side regions 1025 and the forward sections 1029 are configured so as to maintain the tow hook 110 in place in response to a towing or other pulling force, but to allow the tow hook 110 to be displaced when an impact is received on the tow hook 110 that exceeds a predetermined threshold.

As shown in FIG. 10B, as a result of application of the force 700 and the force applied to the deformable side regions 1025 by the connectors 130, the deformable side regions 1025 deform to permit the connectors 130 to move therethrough. By permitting displacement of the connectors 130 attached to the tow hook 110, the tow hook 110 is displaceable toward and/or into the mount 1020 in response to application of the force 700.

Figure 11:
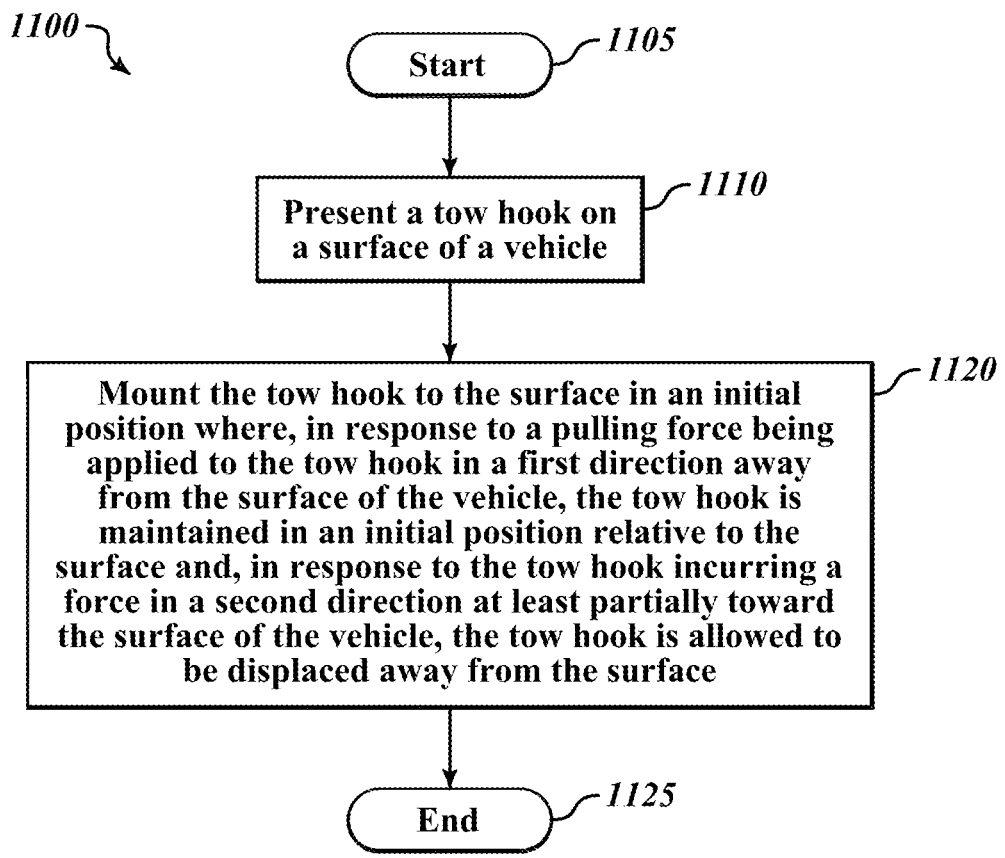
FIG. 11 is a flow chart of an illustrative method of displaceably mounting a tow hook to a surface of a vehicle.

Referring to FIG. 11, an illustrative method 1100 of displaceably mounting a tow hook on a vehicle is provided. The method 1100 starts at a block 1105. At a block 1110, a tow hook is presented on a surface of a vehicle. At a block

1120, the tow hook is mounted to the surface in an initial position where, in response to a pulling force being applied to the tow hook in a first direction away from the surface of the vehicle, the tow hook is maintained in an initial position relative to the surface and, in response to the tow hook incurring a force in a second direction at least partially toward the surface of the vehicle, the tow hook is allowed to be displaced away from the surface. The method 1100 ends at a block 1125.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
a tow hook configured to extend in a first direction from a surface of a vehicle and to receive a towing line;
a mount configured to secure the tow hook to the surface wherein the mount is configured to:
maintain a position of the tow hook relative to the surface in response to a pulling force being applied to the tow hook in a first direction away from the vehicle; and
enable the tow hook to move relative to the surface in response to the tow hook incurring a force in a second direction, wherein the second direction is at least partially toward the surface of the vehicle;
wherein the tow hook includes a plurality of base portions extending generally in the first direction and a transverse portion extending across the plurality of base portions;
wherein the mount is configured to engage the plurality of base portions; and
one or more connectors disposed through the base portions and the mount.

2. The apparatus of claim 1, wherein the mount is configured to permit the tow hook to be displaced from the surface of the vehicle in response to incurring the force in the second direction.

3. The apparatus of claim 1, wherein the mount comprises a deformable portion disposed between the one or more connectors and the surface of the vehicle that is configured to perform an action chosen from breaking, displacing, and deforming in response to the tow hook incurring the force in the second direction.

4. The apparatus of claim 1, wherein each of the one or more connectors is configured to transversely secure the base portion to the mount and shear to permit the tow hook to be released in response to the tow hook incurring the force in the second direction.

5. The apparatus of claim 1, wherein each of the plurality of base portions includes a brace configured to engage a back side of the mount adjacent to the surface of the vehicle to maintain the position of the tow hook in response to the pulling force being applied to the tow hook in the first direction.

6. The apparatus of claim 1, wherein the surface includes a bumper and the mount is chosen from an installation in which the mount is integral to the bumper and attachable to the bumper.

7. The apparatus of claim 1, wherein each of the plurality of base portions comprise a deformable portion disposed between the one or more connectors and the transverse portion of the tow hook that is configured to perform an action chosen from breaking, displacing, and deforming in response to the tow hook incurring the force in the second direction.

8. The apparatus of claim 1, wherein each of the plurality of base portions comprise a deformable portion disposed between the one or more connectors and the surface of the vehicle that is configured to perform an action chosen from breaking, displacing, and deforming in response to the tow hook incurring the force in the second direction.

9. A vehicle comprising:
a vehicle body;
a cabin incorporated in the vehicle body and configured to receive an operator;
a drive system supported by the vehicle body and configured to control one or more wheels of the vehicle to motivate, accelerate, decelerate, stop, and steer the vehicle, wherein the drive system includes one of an electric power system and a hybrid power system;
a tow hook configured to extend in a first direction from a surface of the vehicle body and to receive a towing line;
a mount configured to secure the tow hook to the surface wherein the mount is configured to:
maintain a position of the tow hook relative to the surface in response to a pulling force being applied to the tow hook in a first direction away from the vehicle; and
enable the tow hook to move relative to the surface in response to the tow hook incurring a force in a second direction, wherein the second direction is at least partially toward the surface of the vehicle;
wherein the tow hook includes a plurality of base portions extending generally in the first direction and a transverse portion extending across the plurality of base portions;
wherein the mount is configured to engage the plurality of base portions; and
one or more connectors disposed through the base portions and the mount.

10. The vehicle of claim 9, wherein the mount is configured to permit the tow hook to be displaced from the surface of the vehicle in response to incurring the force in the second direction.

11. The vehicle of claim 9, wherein the mount comprises a deformable portion disposed between the one or more connectors and the surface of the vehicle that is configured to perform an action chosen from breaking, displacing, and deforming in response to the tow hook incurring the force in the second direction.

12. The vehicle of claim 9, wherein each of the one or more connectors is configured to transversely secure the base portion to the mount and shear to permit the tow hook to be released in response to the tow hook incurring the force in the second direction.

13. The vehicle of claim 9, wherein each of the plurality of base portions includes a brace configured to engage a back side of the mount adjacent to the surface of the vehicle to maintain the position of the tow hook in response to the pulling force being applied to the tow hook in the first direction.

14. The vehicle of claim 9, wherein the surface includes a bumper and the mount is chosen from an installation in which the mount is integral to the bumper and attachable to the bumper.

15. The vehicle of claim 9, wherein each of the plurality of base portions comprise a deformable portion disposed between the one or more connectors and the transverse portion of the tow hook that is configured to perform an action chosen from breaking, displacing, and deforming in response to the tow hook incurring the force in the second direction.

16. The vehicle of claim 9, wherein each of the plurality of base portions comprise a deformable portion disposed between the one or more connectors and the surface of the vehicle that is configured to perform an action chosen from breaking, displacing, and deforming in response to the tow hook incurring the force in the second direction.

17. A method comprising:
providing a tow hook at a surface of a vehicle; and
mounting the tow hook to the front surface in an initial position, wherein:
in response to a pulling force being applied to the tow hook in a first direction away from the surface of the vehicle, the tow hook is maintained in an initial position relative to the surface; and
in response to the tow hook incurring a force in a second direction at least partially toward the surface of the vehicle, allowing the tow hook to be displaced away from the surface;
wherein the tow hook includes a plurality of base portions extending generally in the first direction and a transverse portion extending across the plurality of base portions;
wherein a mount is configured to engage the plurality of base portions; and
wherein one or more connectors are disposed through the base portions and the mount.

18. The method of claim 17, wherein mounting the tow hook to the surface includes releasably securing the tow hook to the surface to enable the tow hook to move relative to the surface in response to the tow hook incurring a force in the second direction.

* * * * *